United States Patent [19]

Frielink

[11] 3,719,648

[45] March 6, 1973

[54] PROCESS FOR THE PREPARATION OF POWDERY HOMO- OR COPOLYMERS OF ETHYLENE

[75] Inventor: Johannes M. Frielink, Sittard, Netherlands

[73] Assignee: Stamicarbon N. V., Heerlen, Netherlands

[22] Filed: June 23, 1971

[21] Appl. No.: 155,798

[30] Foreign Application Priority Data

June 29, 1970 Netherlands ..................7009555

[52] U.S. Cl. ...260/85.5 R, 260/85.5 HC, 260/85.5 P, 260/86.7, 260/87.3, 260/87.5 C, 260/88.1 R, 260/88.2 R, 260/88.2 F, 260/94.9 R, 264/143, 264/310
[51] Int. Cl. ............................C08f 3/04, C08f 15/04
[58] Field of Search ..260/88.1 R, 94.9 R, 88.2, 87.5, 260/86.7, 85.5

[56] References Cited

UNITED STATES PATENTS 3,090,778   5/1963   Ehrlich et al. ................260/94.9 GD
3,255,171   6/1966   Eilbracht et al. ................260/94.9 R
3,372,153   3/1968   Turner et al. ....................260/88.1 R

*Primary Examiner*—Harry Wong, Jr.
*Attorney*—Cushman, Darby & Cushman

[57] ABSTRACT

A process for the recovery of powdery homopolymers or copolymers of ethylene from a polymerization system is disclosed, wherein the corresponding monomers are subjected to polymerization conditions in a reactor and the resulting polymer, together with unconverted monomer, is discharged from the reactor and expanded to a lower pressure. At least part of this mixture is quenched by the addition of a cold gas, which gas is at least one of the polymerization monomers, to a temperature below the melting point of the polymer to solidify the polymer contained in such mixture as the form of a fine powder. Thereafter the powder is separated from the mixture and remaining unconverted monomer is recycled to the reactor. The process involves simpler equipment and reduced utility costs as compared to prior processes.

11 Claims, 4 Drawing Figures

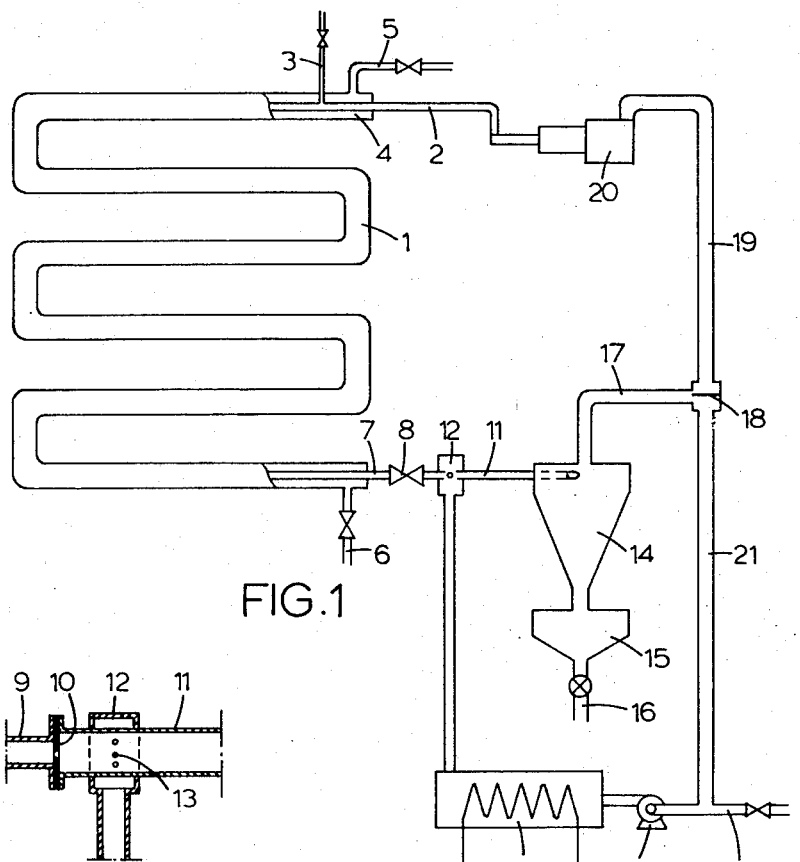
FIG.1
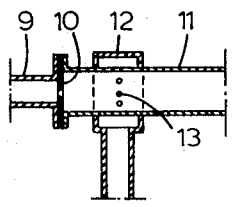
FIG.2
FIG.3

PROCESS FOR THE PREPARATION OF POWDERY HOMO- OR COPOLYMERS OF ETHYLENE

BACKGROUND OF THE INVENTION

Homopolymers and copolymers of ethylene are prepared by subjecting ethylene, mixed, in the case of copolymer production, with one or more unsaturated, organic compounds copolymerizable therewith, to elevated temperatures and pressures, e.g., 120°–400°C and 500 – 5,000 atmospheres, in a reactor in the presence of a polymerization initiator. This high-pressure process is conducted continuously by continuously discharging from the reactor a mixture which contains the resulting polymer and a quantity of unconverted monomer, recovering the polymer after expansion of the mixture and then returning to the reactor, after compression to the reactor pressure, the remaining gaseous monomer, together with a quantity of fresh monomer corresponding to the amount of monomer which has been converted into polymer.

It is desired to use high reaction temperatures in the reactor because of the consequential advantage in high ethylene conversion and polymerization rates. At this high reaction temperature, the temperature of the mixture discharged from the reactor will, even after expansion, still be above the melting point of the polymer, so that the polymer is removed from the mixture in the liquid state. The liquid polymer so removed may be transported to a device wherein it is given the form (for instance, granules or powder) desired by the end user. As a rule such a device consists of an extruder which forms the polymer into the form of strands which are thereafter cooled in a water bath to below the melting point of the polymer and are thereafter reduced to granules by means of a granulating device. If a powdery product is required, for instance, for applications involving rotational moulding, whirl-sintering or spray-coating, the granules are ground to the desired fineness.

Because of the high viscosity of the polymer recovered in the liquid state, difficulties arise during the separation and transportation of such polymer. For this reason, it is difficult to prepare polymers with a low melt index, such as, for instance, polymers used for the manufacture of tubing, wherein a polymer melt index of less than 0.2 (as measured according to ASTM D 1238–62 T) is required. If a powdery product is to be prepared, the use of extruders and grinders is relatively complicated and clumsy.

The prior art has proposed to expand the mixture withdrawn from the polymerization reactor in such a way that the liquid polymer is present in the gas flow as a mist of fine droplets. Subsequently this mist is quenched to a temperature below the melting point of the polymer by water injection, to produce an aqueous suspension of polymer powder. The powder is separated off, e.g., by filtration, from the suspension and subsequently dried. The unconverted monomer from which the polymer has been separated is saturated with water vapor, which must be removed before such monomer is returned to the reactor. This process requires rather complex apparatus because of the extra steps which are necessary for the aftertreatment of the polymer and the drying of the unconverted monomer (see U.S. Pat. No. 2,831,845).

It is also known to cool the mixture leaving the polymerization reactor by external cooling to a temperature slightly above the melting point of the polymer and thereafter to expand such cooled mixture to produce a solid polymer powder. Such a process is most difficult to control because the temperature of the mixture leaving the polymerization reactor is not constant, but may be subject to wide fluctuations, and since the ultimate cooling at which the polymer changes into the solid state occurs, in this process, during the expansion step, there is a decided risk that the exchange device will be clogged by solid particles and that the solidified particles will agglomerate (see U.S. Pat. No. 3,090,778).

DESCRIPTION OF THE INVENTION

The present invention provides an improvement on the prior art processes acknowledged above. The present invention relates, as mentioned previously, to a process wherein powdery homo polymers or copolymers of ethylene are prepared by subjecting monomer, which monomer is ethylene mixed with 0 – 50 percent of at least one other unsaturated organic compound copolymerizable with ethylene, in a reactor to elevated temperatures and pressures in the presence of a polymerization initiator. The polymer formed in the polymerization reactor is discharged from the reactor, together with a quantity of unconverted monomer. This mixture is expanded to a lower pressure and at least a part of such expanded mixture is quenched to solidify the polymer in the form of a fine powder. The powder is separated from the remaining mixture and the remaining unconverted monomer is recycled to the reactor after being compressed to substantially the reactor pressure. The quenching is effected by the addition of a quantity of cold gas, which gas consists essentially of at least one of the monomers to be polymerized, to the expanded mixture. Thereafter, the polymer is removed from the quenched mixture, preferably by means of a cyclone. Thus, a dry powdery polymer is obtained which does not require further processing in order to be suitable for use in the manufacture of articles by sintering or similar process steps, and which polymer, irrespective of the melt index thereof, can be transported and stored without difficulty. At the same time a gaseous monomer or monomer mixture is obtained which can be returned directly to the reactor after compression without having to be subjected to special purification steps. The apparatus used to practice the present invention is therefore considerably simpler than that used in the known process acknowledged above, as a result of the elimination of devices for polymer aftertreatment and for the drying of unconverted monomer.

The temperature of the reaction mixture after the quenching step is determined by the temperature at which the mixture is discharged from the reactor, the degree of expansion to which the mixture is subjected, and the temperature and quantity of the gaseous quenching monomer added to the mixture. As the quantity of converted monomer (polymer) in this mixture generally amounts to about 20 percent, if the quenching of the mixture discharged from the reactor is exclusively by addition of the make-up monomer supplied to the reactor in replacement of monomer polymerized into polymer, it will be necessary for this quenching makesup monomer to be cooled to a very low temperature in order to quench the reaction mixture to a temperature below the melting point of the polymer. However, the present invention also contemplates reducing the temperature of the mixture discharged from the reactor by external cooling before or during the expansion to a point such that the mixture after expansion and before quenching is just above the melting point of the polymer, and in such case a smaller quantity of heat must be withdrawn from the mixture after the expansion to solidify the polymer therein, so that the temperature of the quenching make-up monomer may be proportionally higher.

The solidification of the polymer particles, according to the present invention, only occurs after the mixture discharged from the reactor has been expanded, with the ultimate cooling to solidify the polymer effected by the addition of the cold monomer, and therefore there is no risk of the expansion device becoming clogged by solidified polymer, which is a distinct drawback to the prior art process acknowledged above.

It is also possible, according to the present invention, to introduce an excess quantity of cold monomer into the mixture discharged from the reactor after expansion thereof. In this case, wherein the quantity of cold monomer added is more than the amount necessary to replace the monomer which has been converted into polymer, the gaseous monomer remaining after polymer removal may be separated into a portion which is returned to the reactor and a portion which, after the incorporation of a quantity of monomer corresponding to the amount of monomer converted into polymer, is cooled and reintroduced into the mixture leaving the reactor as the quenching agent. In this manner, the quantity of quenching agent is increased so that the temperature of this quenching monomer may be higher than would be the case if only the make-up monomer to be supplied to the reactor serves as the quenching agent.

The adiabatic expansion of the mixture discharged from the reactor produces the largest cooling result when the expansion is to atmospheric or to sub-atmospheric pressure. In this case, however, the unconverted monomer must be compressed to a greater degree to be at the reactor pressure and therefore, in view of the cost of compression energy, it is generally advantageous not to expand the mixture completely to atmospheric pressure or below. In practice, this means that a compromise will be chosen between the final expansion pressure and the quenching monomer pressure which is most favorable from an energy viewpoint. The embodiments mentioned above, e.g., external cooling of the mixture leaving the reactor prior to or during expansion, and application of an excess quantity of quenching agent, can be used not only to allow the use of a higher quenching agent temperature, but also to allow the utilization of a higher pressure of the mixture after expansion. However, in any event, a certain expansion, on the order of at least 100 times the volume of the mixture discharged from the reactor is necessary to obtain the required mist formation.

If a product in granulate form, in addition to a powdery product, is required, the mixture discharged from the reactor can be divided into two parts. Polymer may be removed in the liquid state, in the manner used by the prior art acknowledged above, from a first portion and the other second portion may, after expansion, be mixed with cold quenching monomer in accordance with the present invention. In such a situation, the second portion is preferably chosen of such a size that a quantity of monomer corresponding to the amount of monomer converted into polymer will suffice to cool this second portion to below the polymer melting point. In this case, the extra compression energy required is limited to that necessary to compress the second portion, from which the polymer has been removed in the form of powder, from the corresponding low final expansion pressure to the pressure, generally about 250 atmospheres, to which the mixture is normally expanded when the polymer is removed in the liquid state. However, this embodiment is limited to applications wherein polymers are produced having a melt index so high that the processing of the liquid polymer does not involve substantial difficulties, and wherein it is desired for part of the production to be obtained in granular form.

The quantity of ethylene in the monomer mixture in the polymerization reactor will be at least 50 mole percent with the comonomer amounting to 0 – 50 mole percent. Suitable comonomers are well known to the art and include, for instance, unsaturated esters, preferably lower alkyl unsaturated esters, such as, for instance, ethyl acrylate, vinyl acetate, or vinyl propionate, alkene compounds, preferably alkene compounds having from three to 10 carbon atoms, such as, for instance, propylene and neo-hexane or other compounds, such as acrylonitrile and vinyl chloride. A further description of suitable comonomers which can be copolymerized with ethylene in the practice of the present invention are disclosed in U.S. Pat. No. 3,372,153, the disclosure of which is hereby incorporated by reference.

The polymerization reaction is conducted in a manner known to the prior art, in the presence of at least one initiating agent. These initiating agents are well-known and include oxygen, peroxides, such as, for instance, diethyl peroxide, di-tertiary butyl peroxide, lauroyl peroxide, capryloyl peroxide, tertiary butyl perbenzoate, as well as azo compounds, azines and oximes. Mixtures of peroxides may be used with such mixtures preferably being chosen such that the different peroxides have different lives of exchange. Instead of these free radical initiators, coordination catalysts commonly used for the low pressure polymerization of alpha olefins, and generally referred to as Zieglar-type catalyst, may be used. Such coordination catalysts may be, for instance, titanium tetrachloride or titanium trichloride in combination with an aluminum organo compound, such as aluminum trialkyls or aluminum alkyl halides. A further description of these initiators will be found in U.S. Pat. Nos. 3,293,233 and 3,373,148, the disclosure of which are hereby incorporated by reference. The initiator may be supplied to the polymerization reactor as a suspension in a diluent or in the form of a solution. The quantity of initiator supplied to the reactor is quite small and is generally, for instance, in the range of 0.001 – 3 mole percent, based on the total quantity of material introduced into the reactor.

Chain transfer agents may also be introduced into the reactor, as is well-known to the art. Such chain transfer agents include hydrogen, saturated hydrocarbons, generally lower alkanes, such as, for instance, propane, butane, isobutane, pentane, in an amount corresponding to about 0.5 to about 10 mole percent, based on the moles of ethylene. Furthermore, other known additives, such as anti-oxidants, slip agents, anti-static agents, and the like may also be utilized.

Ethylene polymerization or copolymerization generally takes place at a temperature of about 120°C to about 400°C, depending upon the nature of the initiator used. During polymerization, a considerable quantity of heat is liberated (about 800 kcal/kg of polyethylene) which must be rapidly withdrawn in order to prevent the temperature from rising to the point where ethylene explosively decomposes into carbon, hydrogen and methane. Normally, the conversion of ethylene into polyethylene or ethylene copolymers amounts to about 12 to about 20 percent.

When the ethylene polymer is to be used for rotational mouldings, the particle size of the polymer powder is preferably about 100 to 800 microns, and for whirl-sintering and textile coating applications, the polymer powder particle size is generally about 50 to 300 microns. The particle sizes are generally controlled by the choice of the size of the discharge opening in the atomizer, with the smaller opening used for the smaller desired particle size. Generally, the atomizer discharge opening will be in the range of 0.5 to 5 millimeters.

DESCRIPTION OF THE DRAWINGS

The invention will be more readily understood by reference to the accompanying drawings wherein:

FIG. 1 represents a schematic diagram of the process of the present invention.

FIG. 2 is a longitudinal cross-section of the atomizer and the mixing head of FIG. 1.

FIG. 3 represents a portion of the flow diagram of FIG. 1, showing a different embodiment thereof.

In FIG. 1, ethylene is added to reactor 1 by way of line 2 at the reactor pressure, which may be, for instance, 2,000 atmospheres. The reactor 1 may be constructed as a tubular reactor, as illustrated, or as an autoclave. The ethylene may be added to the reactor at various locations, as known to the art. If a copolymer of ethylene with another monomer is to be prepared, a mixture of ethylene and such comonomers is introduced into reactor 1 through line 2, with the quantity of ethylene in such mixture amounting to at least 50 percent. A polymerization initiating agent for the formation of free radicals is added to reactor 1 by way of line 3. The polymerization initiating agent may also be added at various locations and, as known to the art, the initiating agent may vary in composition depending upon the point of addition to the reactor.

Figure 4:
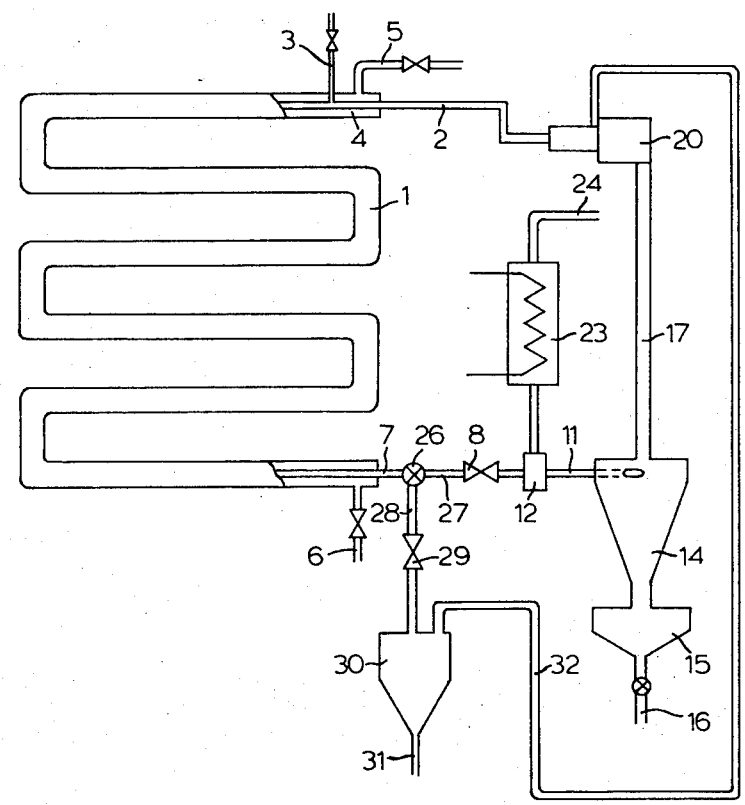
FIG. 4 is a flow diagram illustrating yet another embodiment of the process of the present invention.

As mentioned above, a considerable quantity of heat is liberated during polymerization, and this heat must be rapidly withdrawn in order to prevent the explosive decomposition of ethylene. The heat is withdrawn by cooling the reactor wall by way of a coolant supplied by line 5 to cooling jacket 4, and discharged by line 6, and also by continuously discharging from the reactor, along with polymer formed therein, a quantity of unconverted monomer, and replacing this discharged monomer by cold make-up monomer. The polymer and unconverted monomer in the reactor are discharged through line 7 provided with an expansion valve 8, through which the pressure of the mixture discharged from the reactor decreases virtually to atmospheric pressure. As will be seen more clearly in FIG. 2, the mixture discharged from the reactor passes through a tube section 9, provided with an atomizer 10 at the end thereof. The strong expansion of the monomer and the outflow through the atomizer causes the polymer present in the mixture to be sprayed as a mist of fine droplets into wider line or tube 11. Mixing head 12 is located near the inlet of tube 11 and is fed a quantity of cold monomer which flows through apertures 13 into tube 11 and intensively mixes therein with the mixture passing through the atomizer. The amount of cold quenching monomer supplied through apertures 13 is so chosen that the temperature of the resulting mixture in tube section 11 decreases to below the melting point of the polymer. As a result of this temperature drop, the fine polymer droplets solidify into a fine powder prior to having the opportunity to combine into larger units or to deposit on the wall of the tube 11. The fineness and grain size distribution of the polymer powder are chiefly determined by the selection of the atomizer, so that by choice of a suitable atomizer, which choice is well within the skill of those in the art, the particle size required for the desired purpose can be obtained. If necessary, simple experiments can establish the choice of the proper atomizer.

The mixture of gaseous monomer and polymer powder flows through line 11 into cyclone 14 wherein the powder is separated from the gaseous monomer and is discharged, by way of collecting vessel 15 through line 16. The gaseous monomer leaves the cyclone 14 by way of line 17. Distributor valve 18 divides the gaseous monomer into a part that flows through line 19 and one or more compressors 20, wherein the gaseous monomer is compressed to the required feed pressure in a number of stages, and then is fed to reactor 1, and into a part which is returned to the mixing head 12 by way of line 21, pump 22 and cooler 23. A portion of the quenching monomer fed to the cooling device is fresh monomer, corresponding to the amount of monomer converted into polymer, introduced by way of line 24. The amount of monomer circulating as coolant therefor is larger than the amount of fresh make-up monomer supplied through line 24.

The temperature of the mixture leaving the reactor is substantially higher than the melt temperature of the polymer, which melt temperature is generally about 110°C. In the embodiment represented by FIG. 3, the mixture of unreacted monomer and polymer discharged from reactor 1 through line 7 flows through a cooling device 25, where external cooling decreases the temperature of the mixture to a point somewhat above the melting point of the polymer, preferably at least 10°C above the melting point of the polymer, for instance, to 140°C. For the quenching of this mixture, less heat must be withdrawn from the system, so that a higher final expansion pressure may be used or a higher quenching monomer temperature can be utilized. If desired, a smaller amount of quenching monomer may now be circulated through cooler 23.

In another embodiment represented by FIG. 4, the mixture discharged from reactor 1 through line 7 is divided by a dividing mechanism 26 into a fraction which flows through line 27 and expansion valve 8 wherein such fraction expands to a pressure which is substantially atmospheric, and into a second fraction which flows by way of line 28 and reducing valve 29 wherein the second fraction expands to a pressure of, for instance, 250 atmospheres. The fraction of the mixture flowing through expansion valve 8 is quenched in a manner similar to that described in FIG. 1 to a temperature below the melting point of the polymer by the addition of cold quenching monomer through mixing head 12. After the polymer powder has been separated from the gaseous monomer in cyclone 14, the monomer is fed directly to compressor 20 by way of line 17. Since only a portion of the mixture of monomer and polymer discharged from the reactor is quenched, no excess monomer need by circulated through a mixing head, and it is possible to introduce a quantity of monomer by way of line 24 and cooler 23 to mixing head 12 which corresponds to the amount of monomer converted into polymer.

The fraction of the mixture discharged from the reactor which passes through reducing valve 29 flows into a separator 30, wherein polymer is separated in the liquid state and discharged by way of line 31. The polymer is subsequently subjected to conventional treatment, not illustrated, such as degasification, extrusion, granulation and the like. The remaining monomer, which has a pressure of about 250 atmospheres is lead by way of line 32 directly to an intermediate stage of compressor 20.

EXAMPLES OF THE INVENTION

The invention will be understood more readily by reference to the following examples; however, these examples are intended to illustrate the invention and are not to be construed to limit the scope of the invention.

EXAMPLE I

In the apparatus described in FIG. 1 of the accompanying drawings, 15,600 g/h of ethylene were polymerized at a pressure of 1,900 atmospheres and a temperature of 251°C. 0.04 g/h of di-tertiary butyl peroxide was added to the ethylene as the initiator and 2,364 g/h of polyethylene having a melt index of 0.002 were produced. The mixture discharged from the reactor was expanded to atmospheric pressure through an atomizer having a 3 mm discharge opening, which expansion reduced the temperature of the mixture to 235°C. 30,000 g/h of cold ethylene, having a temperature of −10°C, were added to the mixture by way of mixing head 12, with the temperature of the resulting mixture being 75°C. The product polyethylene was separated from the resulting mixture as a fine powder having the following size distribution: 5 percent smaller than 50 microns, 26 percent having a size from 50 to 200 microns, 37 percent having a size from 200 to 400 microns, 28 percent having a size from 400 to 600 microns and 4 percent being courser than 600 microns, corresponding to an average particle size of 300 microns.

EXAMPLE II

The experiment of Example I was repeated by polymerizing a corresponding amount of ethylene at a pressure of 1,000 atmospheres and a temperature of 250°C. 0.46 g/h of di-tertiary butyl peroxide was added to the 15,600 g/h of ethylene and 2,449 g/h of polyethylene having a melt index of 310 was produced. The temperature in the mixture discharged from the reactor, after expansion to atmospheric pressure, was about 190°C and decreased to 60°C after admixture with 30,000 g/h of ethylene having a temperature of minus 10°C. This high melt index polyethylene was obtained as a fine powdery product 90 percent of which having a particle size between 50 and 600 microns, the average particle size being 310 microns.

EXAMPLE III

In the same manner as described for Example I, 14,600 g/h of ethylene were polymerized, using 0.11 g/h of tertiary butyl perbenzoate as initiator and 4.2 mole percent of propane as chain transfer agent, at 1,850 atmospheres and 223°C. 2,260 g/h of polyethylene having a melt index of 0.18 were produced. After expansion to 1 atmosphere, the temperature of the mixture discharged from the reactor was about 200°C, and this dropped to about 70°C after admixture with 30,000 g/h of monomer having a temperature of 0°C. The polyethylene produced was obtained as a fine powder 92 percent of which having a particle size ranging from 50 to 600 microns, the average particle size being 280 microns.

EXAMPLE IV

In the same manner as in Example I, 15,080 g/h of ethylene were copolymerized with 837 g/h of vinyl acetate at a pressure of 1,900 atmospheres and a temperature of 190°C. 0.30 g/h of capryloyl peroxide was added as initiator and 2.2 mole percent of propane was added as chain transfer agent. 1,960 g/h of ethylene vinyl acetate copolymer having a vinyl acetate content of 1.8 mole percent and a melt index of 0.005 was produced. After expansion to 1 atmosphere, the temperature of the mixture of monomers and polymer discharged from the reactor was about 160°C, and after admixture with 20,000 g/h of a monomer mixture of ethylene and 1.8 mole percent vinyl acetate at 0°C, this temperature dropped to about 70°C. As in the preceding examples, a very fine powder was obtained 90 percent of which having a particle size ranging from 50 to 600 microns, the average particle size being 275 microns.

EXAMPLE V

The experiment of Example I was repeated, whereby the temperature of the mixture leaving the reactor was reduced to 150°C by external cooling prior to the expansion. After expansion to atmospheric pressure the temperature amounted to 132°C. 15,000 g/h of ethylene, having a temperature of 15°C, were added to the expanded mixture, with the temperature of the resulting mixture being about 75°C. The product ethylene was separated from the mixture as a fine powder, 92 percent of which having a particle size between 50 and 600 microns, the average particle size being about 300 microns.

What is claimed is:

1. In a process for the preparation of powdery homopolymers or copolymers of ethylene, wherein (a) monomer, consisting of ethylene and 0 – 50 mole percent of at least one other unsaturated organic compound copolymerizable therewith, is subjected to elevated temperature and elevated pressure in a reactor in the presence of a polymerization initiator, (b) the resulting liquid polymer, together with unconverted monomer, is discharged from the reactor and expanded to a lower pressure, (c) the expanded mixture, at least in part, is quenched by the addition of a cold medium to solidify polymer contained in said mixture to a fine powder, (d) thereafter the powder is separated from the mixture, and (e) the remaining monomer is compressed to substantially said elevated pressure and returned to the reactor, the improvement comprising quenching said expanded mixture with a cold gas which consists essentially of at least one of the monomers to be polymerized.

2. The process as claimed in claim 1, wherein the mixture of polymer and unconverted monomer discharged from the reactor is expanded to at least 100 times its volume.

3. The process as claimed in claim 1, wherein said elevated temperature is about 120° to about 400°C, and said elevated pressure is about 500 to about 5,000 atmospheres.

4. The process as claimed in claim 1, wherein said other unsaturated organic compound is selected from the group consisting of unsaturated esters, alkene compounds, acrylonitrile and vinyl chloride.

5. The process as claimed in claim 1, including the step of adding from 0.5 to 10 mole percent, based on the amount of ethylene, of a chain transfer agent to said reactor.

6. The process as claimed in claim 1, wherein the temperature of the mixture of polymer and unconverted monomer discharged from the reactor is reduced, before or during the expansion, by external cooling to a temperature from 10° to 40°C above the melting point of the polymer.

7. The process as claimed in claim 1, wherein the amount of said cold gas is at least equal to the amount of the monomer polymerized in said reactor.

8. The process as claimed in claim 7, wherein an excess quantity of cold monomer is introduced into the mixture of monomer and polymer discharged from the reactor, and the unconverted monomer remaining after the polymer has been removed is divided into a portion which is returned to the reactor and a second portion which, after having been admixed with a quantity of fresh monomer corresponding to the amount of monomer converted into polymer, is cooled and again used to quench the mixture of polymer and monomer discharged from the reactor.

9. The process as claimed in claim 1, wherein the mixture of polymer and monomer discharged from the reactor divided into a part which is expanded and from which the polymer is separated in the liquid state and into a second part which is expanded and is thereafter quenched with cold monomer, said second part being in an amount such that a quantity of monomer corresponding to the amount of monomer converted into polymer will cause the second part to be cooled below the melting point of said polymer.

10. The process as claimed in claim 1, wherein the temperature of said cold gas is at least 80°C below the melting point of the polymer.

11. The process as claimed in claim 10, wherein the temperature of said cold gas is 90° to 130°C less than the melting point of the polymer.

* * * * *